(12) United States Patent
Kim et al.

(10) Patent No.: US 8,596,561 B2
(45) Date of Patent: Dec. 3, 2013

(54) DUAL FUEL INJECTOR WITH HYDRAULIC LOCK SEAL

(75) Inventors: Hoisan Kim, Dunlap, IL (US); Mark F. Sommars, Sparland, IL (US)

(73) Assignee: Caterpillar Inc., Peoria, IL (US)

( * ) Notice: Subject to any disclaimer, the term of this patent is extended or adjusted under 35 U.S.C. 154(b) by 275 days.

(21) Appl. No.: 13/222,260

(22) Filed: Aug. 31, 2011

(65) Prior Publication Data
US 2013/0048750 A1    Feb. 28, 2013

(51) Int. Cl.
*B05B 1/30* (2006.01)
(52) U.S. Cl.
USPC .............................. 239/585.5; 239/5; 239/584
(58) Field of Classification Search
USPC .............. 239/585.1, 585.3, 88, 89, 91, 533.2, 239/533.11, 569, 584, 5
See application file for complete search history.

(56) References Cited

U.S. PATENT DOCUMENTS

| | | | | |
|---|---|---|---|---|
| 4,239,023 | A | * | 12/1980 | Simko ........................... 123/275 |
| 4,301,825 | A | * | 11/1981 | Simko ........................... 137/111 |
| 5,136,986 | A | | 8/1992 | Jensen |
| 6,073,862 | A | | 6/2000 | Touchette et al. |
| 6,298,833 | B1 | | 10/2001 | Douville et al. |
| 6,431,469 | B2 | * | 8/2002 | Lambert et al. ............ 239/533.3 |
| 6,698,674 | B2 | * | 3/2004 | Dantes et al. ............... 239/585.1 |
| 7,523,740 | B2 | | 4/2009 | Hoenig et al. |
| 2010/0126471 | A1 | | 5/2010 | Cheiky et al. |

FOREIGN PATENT DOCUMENTS

| | | |
|---|---|---|
| EP | 1496243 | 6/2004 |
| GB | 1150043 | 3/1969 |

OTHER PUBLICATIONS

Beppu Osamu et al.; English Abstract of JP61218764; published Sep. 29, 1986; 1 page.
Beppu Osamu et al.; English Abstract of JP61218766; published Sep. 29, 1986; 1 page.

* cited by examiner

*Primary Examiner* — Davis Hwu
(74) *Attorney, Agent, or Firm* — Liell & McNeil

(57) ABSTRACT

A dual fuel injector includes a liquid needle valve member guided to move in and out of contact with a first valve seat positioned between a liquid nozzle chamber and a liquid nozzle outlet set. A gas needle valve member is guided to move in and out of contact with a second valve seat positioned between a gas nozzle chamber and a gas nozzle outlet set. A hydraulic lock seal for inhibiting migration of gas fuel from the gas nozzle chamber into the first fuel includes an annular volume surrounding a guide segment of the gas needle valve member. The annular volume is fluidly connected to the liquid nozzle volume by a seal passage. A check valve positioned in the seal passage may close when a gas fuel supply is exhausted and an engine utilizing the dual fuel injector operates in a limp home single fueling mode.

20 Claims, 8 Drawing Sheets

DUAL FUEL INJECTOR WITH HYDRAULIC LOCK SEAL

TECHNICAL FIELD

The present disclosure relates generally to dual fuel injection systems, and more particularly to a hydraulic sealing strategy when operating in both dual fuel and single fuel modes.

BACKGROUND

Gaseous fuel engines are known for their ability to burn clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. In these engines, the gaseous fuel may be supplied to the engine intake manifold or metered directly into individual cylinders where it is mixed with air prior to being ignited responsive to the pilot diesel injection near top dead center.

U.S. Pat. No. 6,298,833 teaches a dual fuel injector with the ability to directly inject both gaseous and liquid fuels into an engine cylinder. The reference teaches a dual concentric nozzle check design where liquid diesel fuel is injected through a small inner set of orifices through the outer needle and the gaseous fuel is injected through a concentric set of gaseous fuel outlets through a tip component. Recognizing that gaseous fuel has low viscosity and may be unsuitable to lubricate the moving gaseous needle valve member and to inhibit migration of gaseous fuel into the liquid fuel, this reference teaches a fluid sealing strategy in which an annular volume of pressurized liquid fuel surrounds the guide segment of the gaseous needle valve member. The liquid fuel sealing pressure is maintained equal to or slightly greater than the pressure of the gaseous fuels. While this reference may teach an effective strategy for inhibiting leakage of gaseous fuel into the liquid fuel within the dual fuel injector, it fails to anticipate problems or teach solutions to potential operational modes of an engine equipped with a dual fueling system that utilizes gaseous and liquid fuels. For instance, there may be instances where the gaseous fuel supply may be exhausted and the engine may need to operate in a so called limp home mode utilizing only the liquid fuel as a fuel source. Such an operational mode may present previously unrecognized problems in the context of dual fuel injection systems that utilize a dual fuel injector to inject both gaseous and liquid fuels.

The present disclosure is directed toward one or more of the problems set forth above.

SUMMARY OF THE DISCLOSURE

In one aspect, a dual fuel injector includes an injector body that defines a first fuel inlet fluidly connected to a first nozzle chamber, a second fuel inlet fluidly connected to a second nozzle chamber, and a tip component that defines a first nozzle outlet set and a second nozzle outlet set. A first needle valve member is guided in the injector body to move between positions in and out of contact with a first valve seat positioned between the first nozzle chamber and the first nozzle outlet set. A second needle valve member is guided in the injector body to move between positions in and out of contact with a second valve seat positioned between the second nozzle chamber and the second nozzle outlet set. A hydraulic lock seal for inhibiting migration of the second fuel from the second nozzle chamber into the first fuel includes an annular volume surrounding a guide segment of the second needle valve member, and the annular volume is fluidly connected to the first nozzle volume by a seal passage. A check valve is positioned in the seal passage that is movable to a closed position responsive to a pressure differential between the first fuel in the first nozzle chamber and second fuel in the second nozzle chamber in the tip component.

A dual fuel system includes a dual fuel injector that defines a gaseous fuel inlet, a gaseous nozzle outlet set, a liquid fuel inlet and a liquid nozzle outlet set. The dual fuel injector has disposed therein a gaseous nozzle volume fluidly connected to the gaseous fuel inlet, and a liquid nozzle volume fluidly connected to the liquid fuel inlet. A hydraulic lock seal inhibits migration of gaseous fuel into the liquid fuel within the dual fuel injector. A gaseous fuel common rail is fluidly connected to the gaseous fuel inlet, and a liquid fuel common rail is fluidly connected to the liquid fuel inlet. A check valve is positioned in a seal passage of the hydraulic lock seal, and is movable between an open dual fueling configuration and a closed single fueling configuration.

In still another aspect, a method of operating a dual fuel injector includes a step of injecting a first fuel through a first nozzle outlet set by moving a first needle valve member out of contact with a first needle valve seat of a tip component. A second fuel is injected through a second nozzle outlet set by moving a second needle valve member out of contact with a second needle valve seat of the tip component. Migration of the second fuel into the first fuel is inhibited with a hydraulic lock seal. A guide segment of the second needle valve member is lubricated with first fuel moved passed a check valve in a seal passage of the hydraulic lock seal. The seal passage is closed with the check valve responsive to a pressure differential between first fuel in the first nozzle chamber and second fuel in the second nozzle chamber in the tip component.

DETAILED DESCRIPTION

Figure 1:
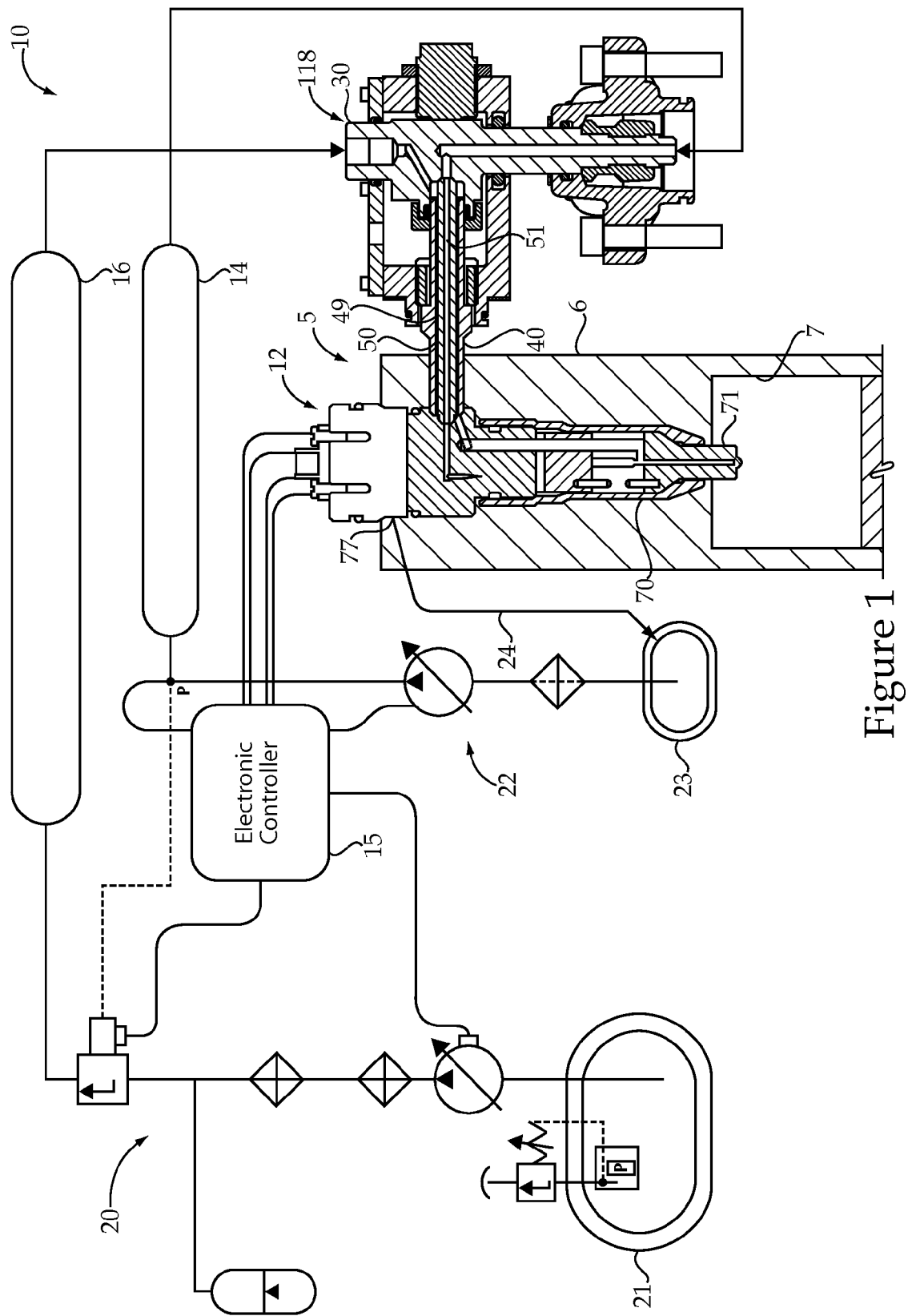
FIG. 1 is a schematic view of an engine and dual fuel common rail system according to the present disclosure.

Referring to FIG. 1, an engine 5 according to the present disclosure utilizes a dual fuel common rail system 10. Engine 5 includes an engine housing 6 that defines a plurality of cylinders 7, only one of which is shown. The dual fuel system 10 includes a plurality of dual fuel injectors 12 (only one shown) that each include an injector body 70 with a tip component 71 positioned for direct injection of gaseous fuel and/or liquid fuel into one of the engine cylinders 7. The dual fuel system 10 includes a plurality of outer tubes 50 and inner tubes 40 that each extend into engine housing 6 between a quill 30 and one of the fuel injectors 12. Each of the inner tubes 50 is compressed between a conical seat on an associated quill 30 and a conical seat on one of the fuel injectors 12. Thus, each engine cylinder 7 has one associated fuel injector 12, one outer tube 40, one inner tube 50 and one quill 30. The dual fuel system 10 includes a source of gaseous fuel in the form of a gaseous fuel common rail 16 that is fluidly connected to each of the fuel injectors 12 through one of the quills 30 and an outer passage 49 defined between an inner tube 50 and an outer tube 40. A source of liquid fuel in the form of a liquid fuel common rail 14 is fluidly connected to each of the fuel injectors 12 through one of the quills 30 and an inner passage 51 defined by the inner tube 50.

An electronic controller 15 is in control communication with each of the fuel injectors 12 to selectively control the timing and quantity of both gaseous and liquid fuel injection events. Electronic controller 15 is also in control communication with a gas pressure control device 20 that is operably coupled to control the pressure in gaseous fuel common rail 16, and also in control communication with a liquid pressure control device 22 operably coupled to control the pressure in liquid fuel common rail 14. Although individual gases, such as methane, propane and the like are within the scope of the present disclosure, natural gas containing a mixture of gas species is particularly applicable to the present disclosure. In addition, the liquid fuel is chosen for the ability for compression ignition at the compression ratio of engine 5. For instance, the liquid fuel may be distillate diesel fuel or some other liquid fuel that is suitable for compression ignition to in turn ignite a charge of gaseous fuel in one of the engine cylinders 7. Thus, during normal operation of engine 5, autoignition conditions will arise in the individual cylinder sometime during the compression stroke in an engine cycle, which includes an expansion stroke, an exhaust stroke and an intake stroke. Although compression ignition conditions for the liquid fuel may exist in the engine cylinder, pressures and temperatures are generally insufficiently high to autoignite the gaseous fuel.

In the illustrated embodiment, natural gas is maintained in a liquid state in a cryogenic liquefied natural gas tank 21. A variable displacement cryogenic pump is controlled by electronic controller 15 to pump liquefied natural gas through filters and a heat exchanger for expansion into a gas that is maintained in an accumulator. The gas pressure control device 20 according to the present disclosure may include an electronically controlled valve that supplies a controlled quantity of gaseous fuel from the supply side (accumulator) to the gaseous fuel common rail 16. This described supply strategy for natural gas is particularly suitable when engine 5 is mounted on a moving machine, such as a mining truck or the like. On the otherhand, if engine 5 were stationary, a gas pressure control device may be connected to a source of available natural gas and then compressed and fed to gaseous fuel common rail 16 in a manner that is controlled by electronic controller 15 to maintain a desired pressure in the rail 16.

The liquid fuel supply to liquid fuel common rail 14 begins at a tank 23. In the illustrated embodiment, the liquid fuel pressure control device 22 includes a high pressure common rail fuel pump of a type well known in the art whose output can be controlled by electronic controller 15 to maintain some desired pressure in liquid common rail 14. Another alternative might include a fixed displacement pump and a rail pressure control valve that returns a quantity of the fuel back to tank 23 in order to control pressure in liquid fuel common rail 14. Any of these alternative strategies fall within the contemplated scope of the present disclosure.

In the event that engine 5 is utilized in a moving machine, the present disclosure contemplates liquefied natural gas tank 21 having a larger capacity (may be 65% greater volume) than the distillate diesel fuel tank 23 in order to account for the expected ratios of consumption from both tanks when operating in a standard dual fueling configuration in which may be over 90% of the fuel delivery to engine 5 is in the form of natural gas and less than 10% in the form of distillate diesel fuel, by mass. This difference in sizing of tanks 21 and 23 also accounts for the densities of the respective liquids as well as the different heating values of the two fuels, as well as accounting for the fact that the natural gas is stored as a liquid but injected as a gas, whereas the distillate diesel fuel is stored and injected as a liquid into engine 5. When operating in a dual fueling mode corresponding to standard operation, electronic controller 15 is configured to maintain the gaseous fuel common rail at a medium low pressure and the liquid fuel common rail 14 at a medium high pressure. If engine 5 is operating in a limp home fueling mode or a single fueling mode, the electronic controller 15 may be configured to maintain the gaseous fuel common rail 16 at a low pressure (may be atmosphere pressure) and the liquid common rail 14 at a high pressure. For the sake of clarity, the identified high pressure is greater than the medium high pressure, which is greater than the medium low pressure, which is greater than the low pressure.

Figure 2:
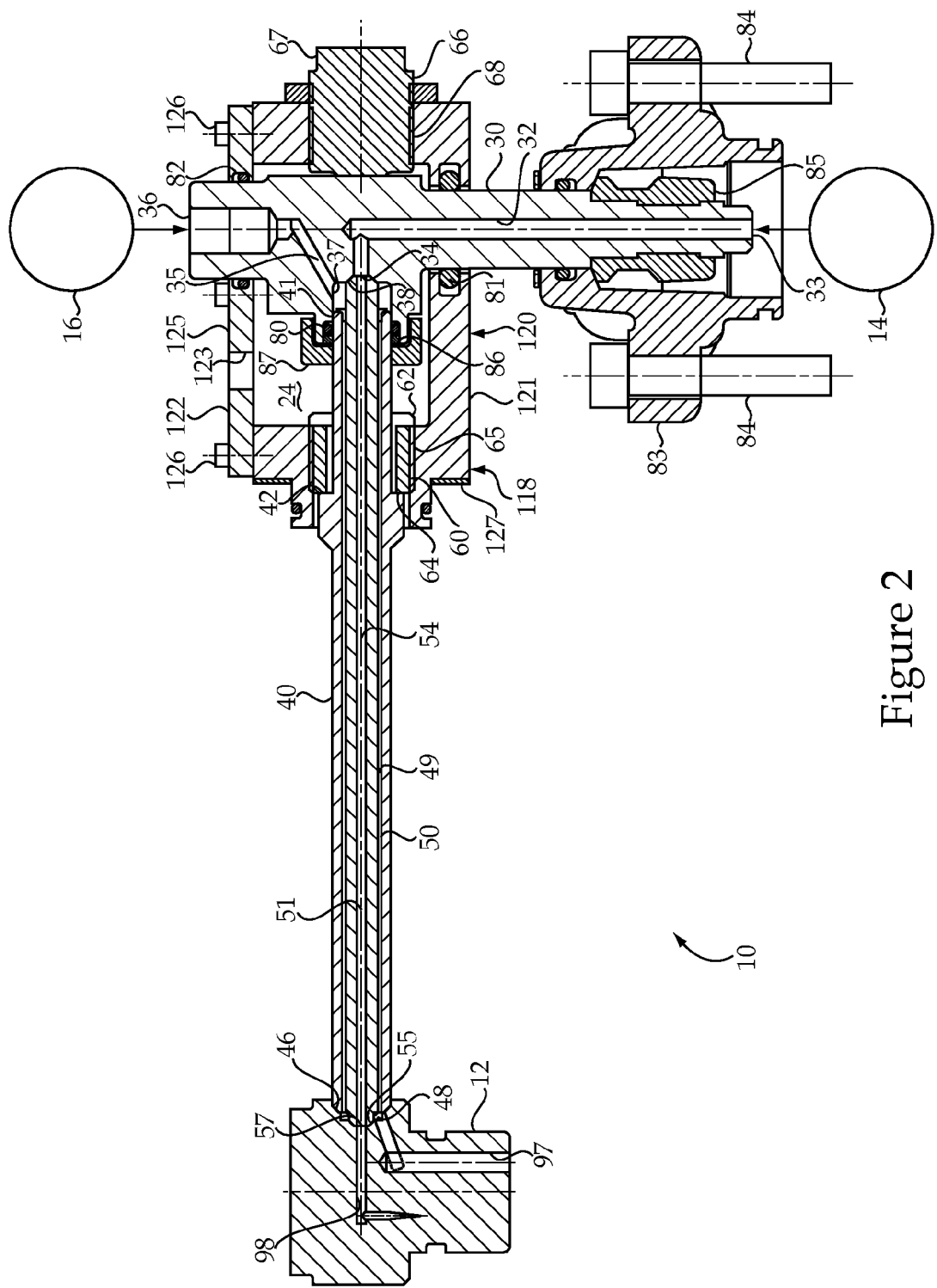
FIG. 2 is a side sectioned view of a portion of the dual fuel system of FIG. 1.

Referring to FIG. 2, the dual fuel common rail system 10 includes a coaxial quill assembly 118 fluidly connecting each fuel injector 12 with liquid and gas common rails 14, 16, respectively. Although the concepts of the present disclosure could apply to a variety of fuels for different types of engines, the illustrated embodiment is particularly suited for a gaseous fuel engine that utilizes distillate diesel fuel for compression ignition. In other words, an engine associated with dual fuel common rail system 10 might primarily burn liquefied natural gas supplied form second common rail 16, and ignite that charge in the engine combustion space by compression igniting a smaller charge of distillate diesel fuel from common rail 14 during a combustion event in one engine cycle.

Coaxial quill assembly 118 includes a quill 30 at least partially positioned in a block 120. The quill includes a first fuel passage 32 extending between a first fuel inlet 33, which is fluidly connected to first common rail 14, and a first fuel outlet 34. Quill 30 also defines a second fuel passage 35 extending between a second fuel inlet 36, which is fluidly connected to second common rail 16, and a second fuel outlet 37. Quill 30 is fluidly connected to rails 14 and 16 using known hardware (e.g., fittings) and techniques. Fuel from first common rail 14 is moved through an engine housing 6 (engine head) via an inner passage 51 through inner tube 50, while fuel from second common rail 16 is moved to fuel injector 12 in an outer passage 49 defined between inner tube 50 and an outer tube 40. Inner tube 50 may be of a familiar construction to those skilled in the art, in that it includes rounded or conical ends that are compressed between a conical seat 38 of quill 30 and an inner conical seat 55 of fuel injector 12. Thus, the fluid passage 51 within inner tube 50 extends between first fuel outlet 34 of quill 30 and an inner fuel inlet 57 of fuel injector 12. Outer tube 40, which may have no contact with inner tube 50, has an inner diameter larger than an outer diameter of inner tube 50 in order to define an elongate outer passage 49 that opens on one end to second fuel outlet 37 of quill 30 and at its other end to an outer fuel inlet 48 of fuel injector 12. Outer tube 40 includes a rounded or conical end that is compressed into sealing contact with outer conical seat 46 of fuel injector 12. The outer fuel inlet 48 opens between the inner diameter of tube 40 and the outer surface of inner tube 50. Thus, fuel injector 12 defines an outer conical seat 46 that concentrically surrounds an inner conical seat 55. In addition, the fuel injector 12 includes an inner fuel inlet 57 surrounded by the inner conical seat 55, and an outer fuel inlet 48 positioned between the inner conical seat 57 and the outer conical seat 46.

Outer tube 40 is compressed between quill 30 and the fuel injector 12. In particular, outer tube 40 includes a rounded or conical end in sealing contact with outer conical seat 46 and an opposite end received in a bore defined by quill 30. One end 41 outer tube 40 is sealed via an O-ring 80 that is positioned in a space 45 between outer tube 40 and quill 30. O-ring 80 is maintained in place against the pressure from second common rail 16 by a back up ring 86 held in place by a cap 87 threaded to quill 30. Outer tube 40 is compressed onto outer seat 46 of fuel injector 12 by an axial force applied to a load shoulder 42 by a compression load adjuster 60 that includes a contact surface 64 in contact with load shoulder 42. Compression load adjuster 60 includes outer threads 65 that mate with a set of inner threads defined by base 121 of block 120, and includes a tool engagement surface 62 located in hollow interior 124 of block 120 to facilitate adjusting a compression load on outer tube 40. Thus, leakage of the second fuel from common rail 16 to atmosphere is inhibited by setting a compression load on the outer tube 40 with compression load adjuster 60 above a predetermined threshold to facilitate a seal at outer conical seat 46, and by sealing the other end with o-ring 80.

Sealing at opposite ends of inner tube 50 is facilitated by a separate load adjuster 66 that includes threads 68 mated to internal threads defined by base 121 of block 120. Load adjuster 66 includes a tool engagement surface 67 located outside of block 20 that facilitates movement of compression load adjuster 66 along a common centerline 54. In other words, compression load adjuster 70 pushes along common centerline 54 against quill 30 to compress inner tube 50 between conical seat 38 of quill 30 and conical seat 55 of fuel injector 12. Because one end 41 of outer tube 40 can slide within quill 30, the respective compression loads on inner tube 50 and outer tube 40 can be adjusted independently to better insure proper sealing at all of the conical seats 38, 55 and 46. Thus, leakage of the first fuel originating from common rail 14 into the second fuel is inhibited by setting a compression load on the inner tube 50 above a predetermined threshold with compression load adjuster 66. In addition, leakage of the second fuel from common rail 16 into the first fuel from common rail 14 may include setting the pressure in common rail 14 higher than the pressure in common rail 16. Outer tube 40, inner tube 50, compression load adjuster 60, compression load adjuster 66, conical seat 38, inner conical seat 55 and outer conical seat 46 all share a common centerline 54. Other sealing strategies for one or both of inner tube 50 and outer tube 40 apart from that described in relation to the drawings also fall within the contemplated scope of the present disclosure. Inner fuel inlet 51 is surrounded by conical seats 55 and 46, but out fuel inlet 48 is between conical seats 55 and 46.

As shown, quill 30 may be at least partially positioned within block 120, which includes a base 121 and a cover 122 that may be attached to base 121 by a plurality of fasteners 126. Base 121 may include a flange that facilitates attachment of block 120 to an engine head (housing 6) via bolts 128. As shown in the Figures, the first fuel inlet 33 and the second fuel inlet 36 of quill 30 may be located outside of block 120. A shim 127 may be included to adjust the distance between conical seat 38 and conical seat 57 to compensate for geometrical tolerances in the fuel system and engine components. Any of the second fuel that manages to leak past O-ring 80 into hollow interior 124 of block 120, may be vented to atmosphere via vent opening 123. Thus, vent opening 123 might be eliminated in a case where the fuel in common rail 16 is not gaseous at atmospheric pressure. Except for vent opening 123, hollow interior 24 may be substantially closed via an O-ring 81 that is in contact with quill 30 and block 120, and surrounds first fuel passage 32. In addition, a second O-ring 82 may be in contact with quill 30 and block 120, and surround the second fuel passage 35. Thus, vent opening 123 extends between hollow interior 125 and an outer surface 125 of block 120, which is exposed to atmosphere.

Coaxial quill assembly 118 may also include a flange 83, collar 85 and bolts 84 to facilitate a sealed fluid connection between quill 30 and common rail 14. Although co-axial quill assembly 118 is illustrated as including a separate block 120 and quill 30, those skilled in the art will appreciate that the functions and structures of those two components could be merged into a single component without departing from the present disclosure.

Figure 6:
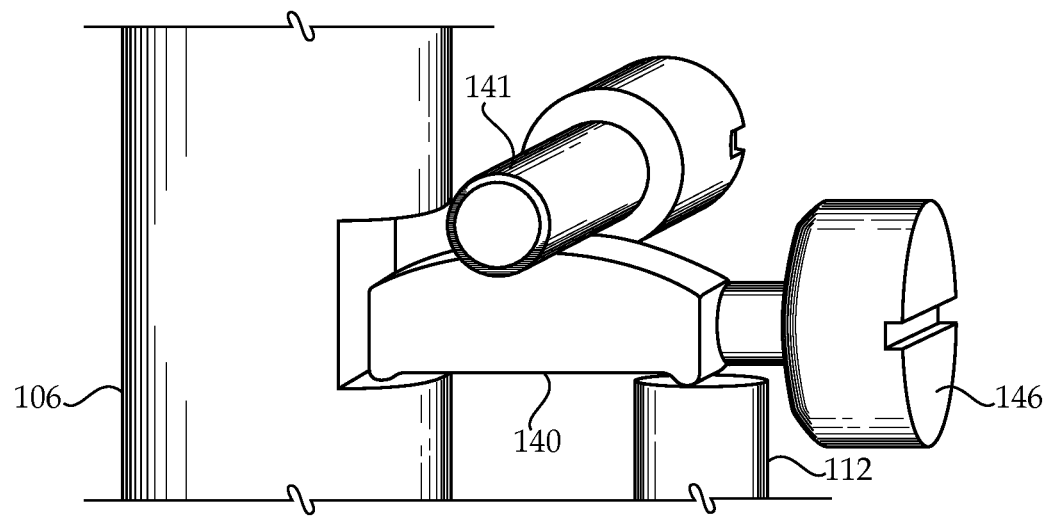
FIG. 6 is a partial perspective view of the lever components from the fuel injector of FIG. 3.
Figure 7:
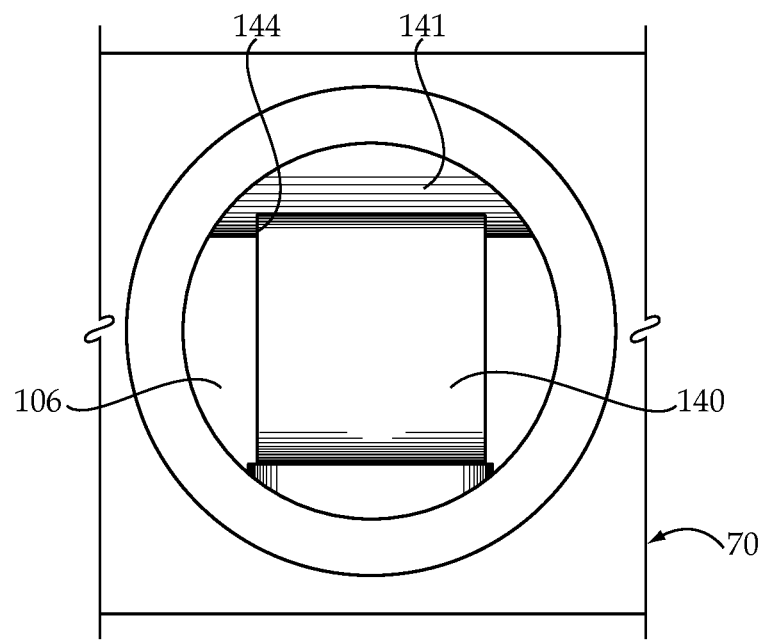
FIG. 7 is an end view of the lever shown in FIG. 6.
Figure 8:
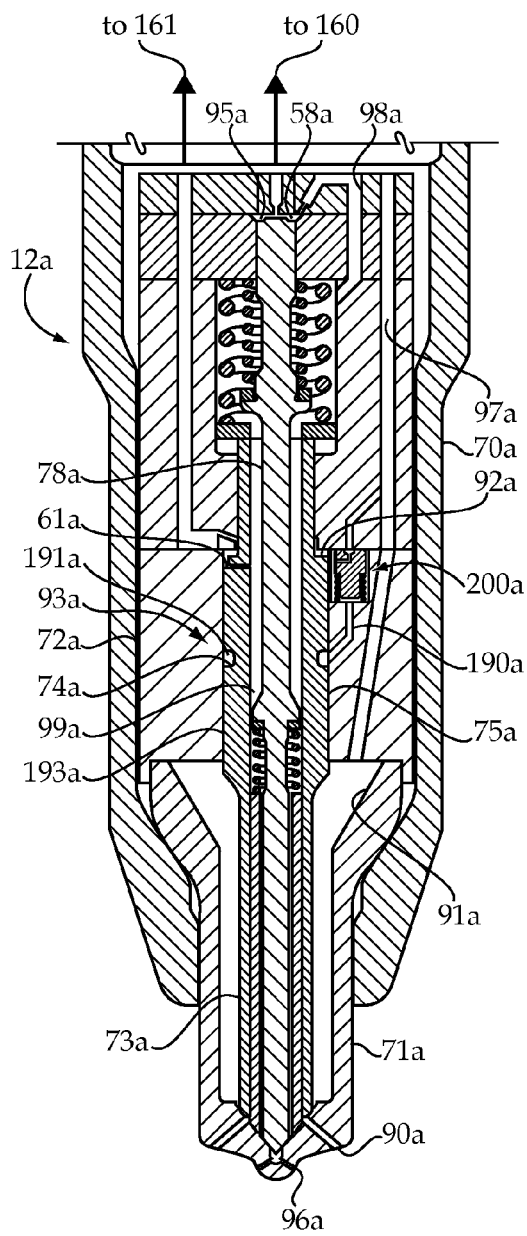
FIG. 8 is a sectioned side view of a bottom portion of a fuel injector according to one aspect of the present disclosure.
Figure 9:
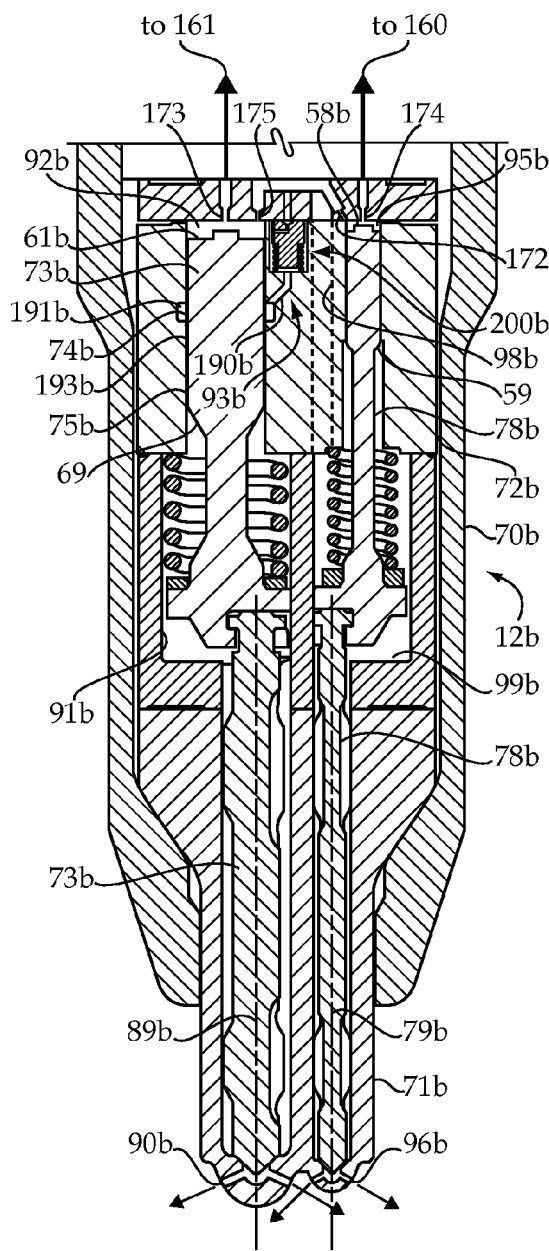
FIG. 9 is a sectioned side bottom portion view of a fuel injector according to another aspect of the present disclosure.

Referring now to FIGS. 3-9, each of the fuel injectors 12 includes two electronically controlled valves 117, 119, which may be considered needle control valves, that are individually actuated via a dual solenoid actuator 100 in control communication with electronic controller 15. In particular electronically controlled valve 117 includes an electrical actuator 43 operably coupled to control valve member 153, whereas valve 119 includes an electrical actuator 44 operably coupled to control valve member 154. In the illustrated embodiment, the dual control valves 117 and 119 are three-way valves that raise and lower pressure in respective needle control chambers 95, 92 via connection and disconnection to low pressure drain outlet 77. As shown in FIG. 1, drain outlet 77 is fluidly connected to tank 23 via a drain return line 24. Although not necessary, each fuel injector 12 may include exactly one drain outlet 77. Thus, those skilled in the art will recognize that all of the control functions for fuel injector 12 are performed using the liquid fuel as a hydraulic medium in a manner well known in the art. FIGS. 8 and 9 show two different versions of a bottom portion of fuel injector 12. FIG. 8 shows a version in which the fuel injector has concentric gas nozzle outlet set 90a and a liquid fuel nozzle outlet set 96a, whereas FIG. 9 shows a configuration in which the gas nozzle outlet set 90b is side by side with the liquid fuel nozzle outlet set 96b. In the embodiment of FIG. 9, liquid needle valve member 78b guided in injector body 70b to move along a centerline 79b, and gas needle valve member 73b guided injector body 70b to move along a centerline 89b that is parallel to, but offset from, centerline 79b. In the case of the dual concentric fuel injector FIG. 8, both the gas needle valve member 73a and the liquid needle valve member 78a are guided in injector body 70a to move along a common centerline. Identical features in the two different fuel injector versions are identified with the same numerals, but the numerals include an "a" in the case of the dual concentric configuration of FIG. 8, and include a designation "b" in the case of the side by side version of FIG. 9. In both versions, the respective gas needle valve member 73 and liquid needle valve member 78 seat at a gas needle valve seat and a liquid needle valve seat locations on the same tip component 71 of the injector body 70. Two components 71 also defines both the liquid nozzle outlet set 96 and the gaseous nozzle outlet set 90.

Regardless which version of the fuel injector is utilized, the gas needle valve member 73 will include an opening hydraulic surface 69 exposed to fluid pressure in gaseous nozzle volume 91 and a closing hydraulic surface 61 exposed to fluid pressure in gaseous needle control chamber 92. On the otherhand, liquid needle valve member 78 will include an opening hydraulic surface 59 exposed to fluid pressure in liquid nozzle chamber 99, and a closing hydraulic surface 58 exposed to fluid pressure in liquid needle control chamber 95. Gas needle valve member 73 is part of a gas direct control needle valve 53, and liquid needle valve member is a portion of a liquid direct control needle valve 52.

Figure 3:
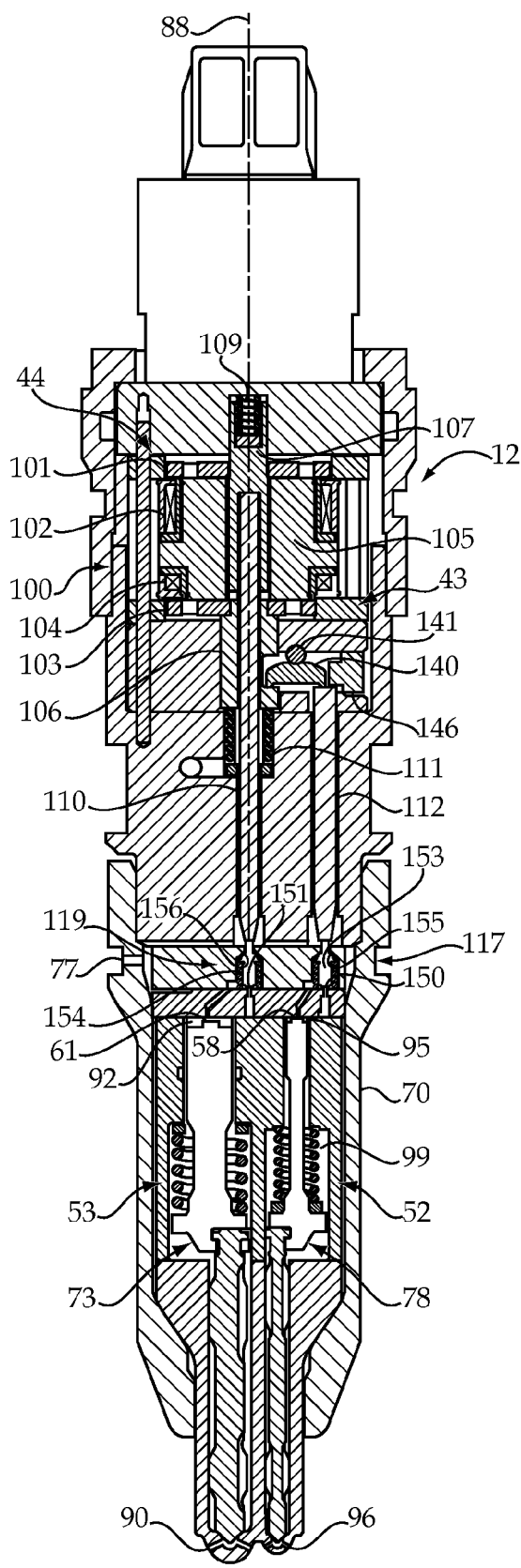
FIG. 3 is a sectioned side view of one of the dual fuel injectors from FIG. 1.
Figure 4:
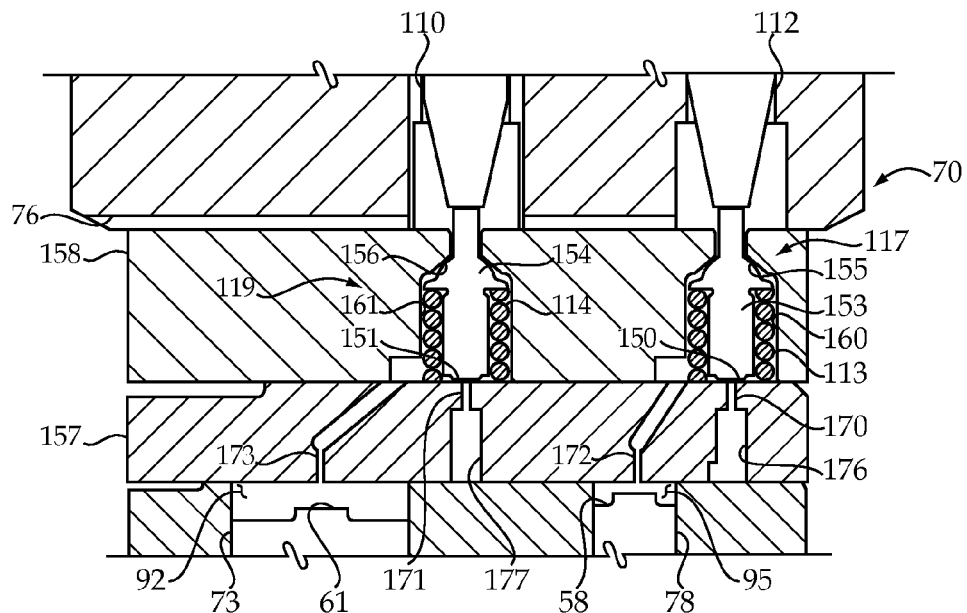
FIG. 4 is a partial sectioned side view of the control valve portion of the fuel injector of FIG. 3.
Figure 5:
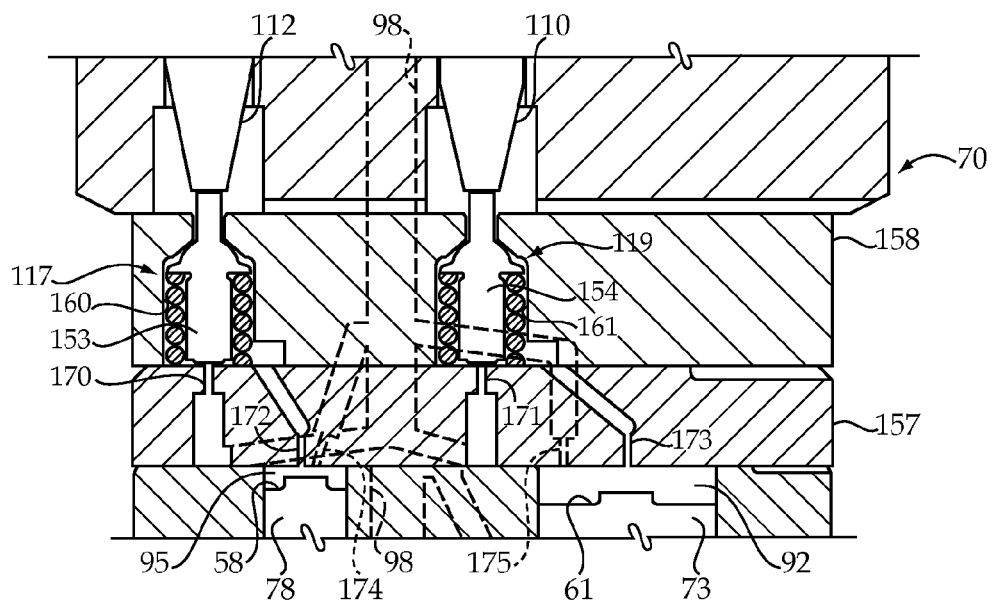
FIG. 5 is an enlarged sectioned view of the control valve portion similar to FIG. 4 except along a different section line through the fuel injector of FIG. 3.

As shown in FIG. 3, a dual solenoid actuator 100 may be utilized for independently controlling the two needle control valves 117 and 119 in different configurations to provide a noninjection configuration, a liquid or diesel fuel injection configuration, a gaseous fuel injection configuration, and even a combined injection configuration. Dual solenoid 100 is shown in its noninjection configuration with a first armature 101 in an unenergized position, a second armature 103 in an unenergized position and a lever 140 in a first angular orientation, which is horizontal in the illustrated embodiment (See FIG. 6). First armature 101 is attached to a guide piece 106 that is itself attached to a pusher 110, which in turn contacts control valve member 154. Pusher 110 is in contact but is unattached to valve member 154 so that the two can actually separate during over travel to inhibit bouncing and unnecessary fuel injections. Armature 101, guide piece 107 and pusher 110 are biased into contact with control valve member 154 by a relatively weak over travel spring 109. A stronger biasing spring 114 biases control valve member 154 into contact with conical seat 156 to close a fluid connection between valve chamber 161 and low pressure passage 76, which connects to drain outlet 77. Thus, when first electrical actuator 44 is de-energized, pusher 110 is in contact with valve member 154, which is itself in contact to close conical seat 156, which is formed in a stack component 158 of injector body 70. As best shown in FIGS. 4 and 5, needle control chamber 92 is always fluidly connected to liquid nozzle supply passage 98 via a Z orifice 175. When control valve member 154 is in its upward position in contact with conical seat 156, needle control chamber 92 is also fluidly connected to liquid nozzle supply passage 98 via a pressure communication passage 177, through valve chamber 161 and A orifice 173. Pressure communication passage 177 includes an F orifice 171 that opens through flat valve seat 161 at one end, and is fluidly connected to liquid nozzle supply passage 98 at its opposite end. Thus, F orifice 171 and A orifice 173 are fluidly in series between liquid nozzle chamber 98 and needle control chamber 92. This fluid connection is blocked when first electrical actuator 44 is energized to move armature 101 from an initial air gap position toward a final air gap position to push valve member 154 with pusher 110 from contact with conical valve seat 156 to contact with flat valve seat 161 to close F orifice 171. When this occurs, needle control chamber 92 becomes fluidly connected to low pressure drain passage 76 via A orifice 173, valve chamber 161 and past conical seat 156, which can be considered a portion of drain passage 76.

Control valve member 154 is thus trapped to move between conical valve seat 156 and flat valve seat 161 corresponding to a valve travel distance that is equal to the armature travel distance from its initial air gap position to its final air gap position. When first electrical actuator 44 is de-energized, the relatively stronger spring 114 pushes control valve member 154 off of flat valve seat 151 toward contact with conical seat 156. When control valve member 154 contacts conical seat 156, pusher 110, guide piece 107 and armature 101 may continue traveling beyond the initial air gap position to an over travel position while further compressing over travel spring 109. When this occurs, pusher 110 may actually move out of contact with control valve member 154. This action inhibits bounce of control valve member 154 off of its conical seat 156 to inhibit secondary fuel injections. As control valve member 154 moves off of flat valve seat 151, pressure in needle control chamber 92 will quickly rise and refilling of the same with liquid fuel is hastened by the two fluid connections to liquid nozzle supply passage 98 via Z orifice 175 and in parallel via F orifice 171 and A orifice 173. Although not necessary, the F orifice may be smaller than the Z orifice, which may be smaller than the A orifice. In all cases, the F, A and Z orifices are of a same order of magnitude, meaning that none are more than ten times larger than any of the other orifices in flow area. Needle control chamber 92 is associated with gaseous direct control needle valve 53, which includes a closing hydraulic surface 61 exposed to fluid pressure therein.

The second needle control valve 117 includes plumbing that may be identical to that of needle control valve 119, but is controlled by a second electrical actuator 43 associated with dual solenoid actuator 100. However, instead of a coaxial actuation arrangement as discussed with the control valve 119, needle control valve 117 is operably coupled to electrical actuator 43 via a linkage that includes a lever 140. Electronically controlled needle control valve 117 includes an armature 103 that is attached to move with a guide piece 106 that is linked to a pusher 112 by a lever 140 that pivots about a pivot pin 141. A relatively weak over travel spring 111 biases guide piece 106 and pusher 112 into contact with control valve member 153. A relatively stronger spring 113 biases control valve member 153 into contact with conical seat 155. Thus, when solenoid coil 104 is de-energized, armature 103 will come to rest at an initial air gap position and pusher 112 will be in contact with control valve member 153. When in this noninjection configuration, needle control chamber 95 is fluidly connected to liquid nozzle supply passage 98 via a Z orifice 174 and in parallel via F orifice 170 and A orifice 172. Pressure passage 176 connects at one end to liquid nozzle supply passage 98 and includes at its opposite end F orifice 170 that opens through a flat valve seat 150. Like control valve member 154, control valve member 153 is trapped to move between flat valve seat 150 and conical seat 155. When coil 104 is energized, armature 103 will move from its initial air gap position toward its final air gap position. When this occurs, guide piece 106 acts on one side of lever 140 causing it to pivot from an initial angular orientation toward a second angular orientation about pivot pin 141 to move pusher 112 downward to push valve member 153 out of contact with conical seat 155 toward contact with flat valve seat 150 to close F orifice 170. When this occurs, needle control chamber 95 becomes fluidly connected to low pressure drain passage 76 via A orifice 172, valve chamber 160 and past conical valve seat 155, which may be considered a portion of low pressure drain passage 76. Needle control chamber 95 is associated with liquid direct control needle valve 52, which includes a closing hydraulic surface 58 exposed to fluid pressure therein.

Although not necessary, flat seats 150 and 151 and well as all of the F, A and Z orifices 170-175 may be portions of a single stack component 157, which is a portion of injector body 70. Conical seats 155 and 156 may be defined by a second stack component 158 of injector body 70. It should be noted that dual solenoid actuator 100 utilizes a common or shared stator 105 upon which both solenoid coils 102 and 104 are mounted. Thus, magnetic flux necessary to move armature 101 or armature 103, or both is carried by shared stator 105.

As best shown in FIGS. 6 and 7, lever 140 may be shaped to make contact with guide piece 106 and pusher 112 along a line in order to reduce uncertainty with regard to the lever arm lengths on either side of pivot pin 141. Migration of lever 140 along pivot pin 141 may be inhibited by including a groove 144 on the underside of pivot pin 141 that receives a top edge of lever 140 as best shown in FIG. 7. Likewise, the top surface of lever 40 may include an indentation within which pivot pin 141 rests to inhibit migration of lever 140 along a line perpendicular to pivot pin 141. A capture screw 146 may be utilized for initial positioning of lever 140 in fuel injector 12. Capture screw 146 may also inhibit escape of lever 140 during manufacturing and handling. Finally, when properly installed, there may be a slight separation distance between lever 140 and capture screw 146 to avoid interaction between the two during normal operation of fuel injector 12. Although the linkage provided by lever 140 between control valve member 153 and armature 103 may increase geometric tolerancing, the armature travel distance of armature 103 from its initial air gap position toward to its final air gap position should be equal to the travel distance of control valve member 153 from contact with flat valve seat 150 to contact with conical valve seat 155.

When fuel injector 12 is in a non-injection configuration, both solenoid coils 102 and 104 are de-energized, armatures 101 and 103 are in their initial air gap positions, and pushers 110 and 112 are in contact with respective valve members 154 and 153. In addition, pressure in needle control chambers 92 and 95 is high and about equal to that in the liquid common rail 14 due to the unobstructed fluid connection to same. Control valve members 154 and 153 are both in their upward position in contact with respective conical seats 156 and 155 to close fluid communication between control chambers 92 and 95, respectively, with regard to drain outlet 77. Also, when in a non-injection configuration, the needle control chambers 92 and 95 are fluidly connected to liquid nozzle chamber 99 through respective F orifices 171, 170, respective A orifices 173, 172 and respective Z orifices 175, 174.

When in a gaseous fuel injection configuration, coil 102 is energized, armature 101 has moved from its initial air gap position to its final air gap position causing control valve member 154 to move from contact with conical seat 156 into contact with flat valve seat 151 to close F orifice 171. Likewise, during a liquid injection configuration, coil 104 is energized causing armature 103 to move from its initial air gap position to its final air gap position to rotate lever 140 from first angular orientation to a second angular orientation moving pusher 112 downward to push control valve member 153 from contact with conical seat 155 downward into contact with flat valve seat 150 to close F orifice 170. When in a combined injection configuration, both coils 102 and 104 are energized and the associated armatures and other components move as described above. Lever 140 will be in one angular orientation when fuel injector 12 is in either a gaseous fuel injection configuration or a non-injection configuration, and be in another angular orientation when the fuel injector 12 is in either a liquid fuel injection configuration or a combined injection configuration.

In both versions of fuel injector 12 in FIGS. 8 and 9, a gas needle valve member 73 is positioned completely inside of injector body 70 with a guide surface 75 extending in a guide component 72 of injector body 70 between the first pressure control chamber 92 and the gas nozzle chamber 91. The gas nozzle chamber 91 is always fluidly connected to the gaseous fuel common rail 16, and is therefore at the same pressure as the gaseous fuel common rail 16. A guide segment 74 of gas needle 73 and the guide component 72 define a portion of an annular volume 191 that is always fluidly connected to liquid common rail 14 via a seal passage 190 that is fluidly connected to liquid nozzle supply passage 98, which is also always fluidly connected to liquid nozzle chamber 99. This structure may help to maintain lubricity in the guide clearance 193. Together, annular volume 191 and seal passage 190 may be considered a hydraulic lock seal 93 that inhibits migration of gaseous fuel from gas nozzle chamber 91 along guide clearance 193 into the liquid fuel located in pressure control chamber 92. Because the liquid fuel pressure is generally higher than that of the gaseous fuel, one could expect some leakage of liquid fuel from the hydraulic lock seal into the gas nozzle chamber 91 during normal dual fuel operations. With each gas fuel injection event, the slight amount of liquid fuel that has leaked into the gas nozzle chamber 91 will be injected into the cylinder and burned in due course, again during normal operations. The amount of liquid fuel entering the combustion space due to leakage from hydraulic lock seal 93 may be so low as to not substantially contribute to the heat release of the overall combined gaseous and liquid fuel charge. However, a dual fueling strategy that takes into account the heat release contribution for this small amount of liquid fuel would also fall within the scope of the present disclosure.

Figure 10:
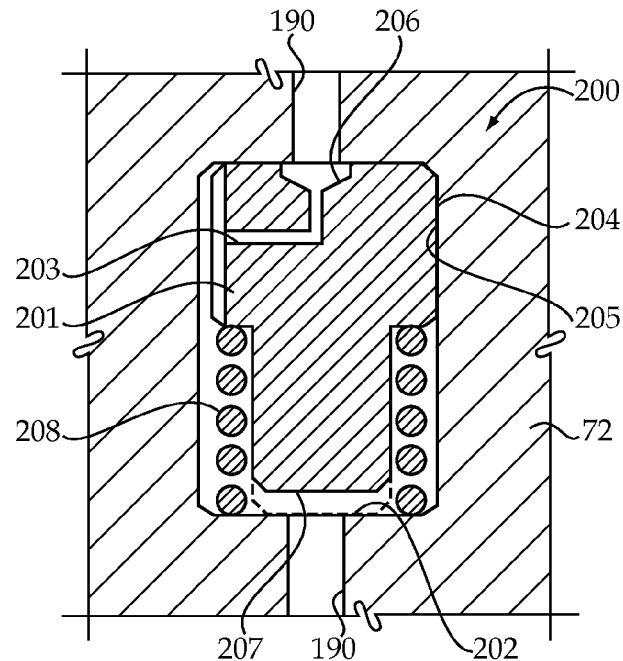
FIG. 10 is an enlarged side sectioned view of a check valve positioned in the seal passage of a hydraulic lock seal for the fuel injectors shown in FIGS. 8 and 9.
Figure 11:
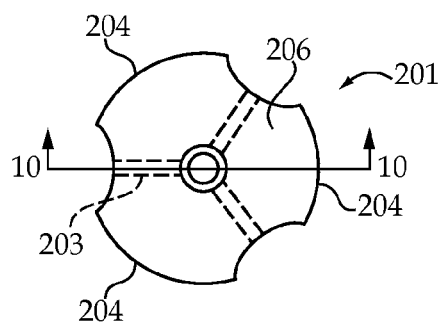
FIG. 11 is a top view of the check valve member from the check valve shown in FIG. 10.
Figure 11:
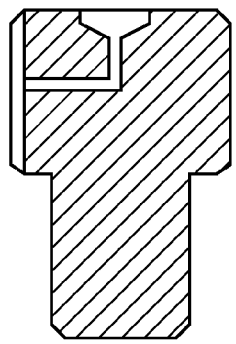

A check valve 200 is positioned within seal passage 190, and is movable to a closed position responsive to a pressure differential between the liquid fuel and the gaseous fuel within fuel injector 12. The detailed structure of one example embodiment of a check valve 200 according to the present disclosure is shown enlarged in FIGS. 10 and 11. Check valve 200 includes a check valve member 201 that is normally biased toward an open position, as shown, by a biasing spring 208. Check valve member 201 may include guide surfaces 204 that have a guide interaction with bore wall 205 of injector body 70 so that check valve member 201 moves along a line when moving from its open position as shown downward toward its closed position as shown with dotted lines. When in the downward closed position, check valve member 201 comes in contact with a flat valve seat 202 to close seal passage 190. The movement and positioning of check valve member 201 is influenced by a hydraulic force from a downstream segment of seal passage 190 acting on the hydraulic surface 207 combined with the preload of biasing spring 208 against a hydraulic force acting from an upstream segment of seal passage 190 on hydraulic surface 206. Check valve member defines a segment 203 of the seal passage 190. The hydraulic surfaces 206 and 207 may be sized along with the strength of preload spring 208 so that check valve 200 remains in its open position, as shown, during normal dual fueling operation when liquid fuel pressure is greater than, but of a same order of magnitude, as the gas fuel pressure. On the otherhand, when gas fuel pressure drops, may be to atmospheric pressure, when the gaseous fuel supply has been exhausted, the liquid fuel pressure may be one or more orders of magnitude greater than the residual gas fuel pressure in gas nozzle chamber 91. This large pressure differential should overcome the spring 208 to cause check valve 200 to move to a closed position where check valve member 201 is in contact with flat valve seat 202. When properly functioning, check valve 200 may substantially reduce or even eliminate leakage of liquid fuel into gas nozzle chamber 91 when gas fuel pressure is low and fuel system 10 is being operated in a single fueling mode using only liquid diesel to power engine 5. Such a mode of operation is sometimes referred to as a limp home mode. Those skilled in the art will appreciate that check valve 200 could take on a wide variety of structural forms without departing from the present disclosure. In the case of the embodiment of FIG. 8, the hydraulic lock seal 93, the check valve 200 and the respective guide segments of both the gas needle valve member 73 and the liquid needle valve member 78 are disposed in a guide component 72 of injector body 70.

INDUSTRIAL APPLICABILITY

The dual fuel common rail system 10 of the present disclosure finds general applicability to any engine that utilizes two fuels in the combustion space of an associated engine. These two fuels may be the same fuel at two different pressures, or may, as in the illustrated embodiment be different fuels. The present disclosure finds particular applicability in gaseous fuel engines that utilize a relatively large charge of natural gas that is ignited via compression ignition of a small charge of distillate diesel fuel originating from common rail 14. The coaxial quill assembly 118 of the present disclosure can facilitate movement of both fuels to a fuel injector 12 mounted in the head 6 of an engine 5 via a single bore through the engine head associated with each fuel injector 12 of the engine 5. This strategy conserves valuable space in and around the engine, and potentially prevents a fuel containment junction with a leak path to the crank case. The F, A, Z three-way control valve of the present disclosure can find potential application in any fuel injector, be it a single fuel injector or a dual fuel injector as shown.

By utilizing a block 120 that is bolted to the outer surface of the engine head, separate load adjusters 60 and 66 can be utilized to independently load the inner tube 50 and outer tube 40 onto the conical seats 57 and 46, respectively of fuel injector 12 to inhibit fuel leakage between the fuels and to inhibit fuel leakage to atmosphere outside of fuel injector 12, while accounting for slight dimensional differences associated with each fuel injector fluid connection.

When in operation, the first fuel (distillate diesel) at a first pressure moves from first common rail 14 through the first fuel passage 32, through inner tube 50 and into fuel injector 12. The second fuel (natural gas) at a second pressure is moved from the second common rail 16 through the second fuel passage 35, through the outer passage 49 between outer tube 40 and inner tube 50 and into fuel injector 12. Leakage of the second fuel to the first fuel may be inhibited by setting the pressure in common rail 14 to a medium high pressure (may be about 40 MPa) higher than the pressure in common rail 16 to medium low pressure (may be about 35 MPa). Inhibiting leakage of the liquid fuel into the gaseous fuel includes setting a compression load on the inner tube 50 above a first predetermined threshold with the compression load adjuster 66 to create appropriate sealing forces on both ends of tube 50. Leakage of the second fuel to atmosphere may be inhibited by setting a compression load on the outer tube 40 above a second predetermined threshold with the second load adjuster 60 to create a seal between outer tube 40 and fuel injector 12. Leakage of gaseous fuel to atmosphere is inhibited by including at least one o-ring, such as o-ring 80 in contact with outer tube 40. Nevertheless, those skilled in the art will appreciate that other concentric tube supply arrangements could be utilized without departing from the present disclosure. However, in the illustrated embodiment, leakage and variations in geometrical tolerances in the various components of engine 5 and fuel system 10 can be accommodated by utilizing first and second compression load adjusters 60 and 66 to respectively adjust the compression loads in the outer tube 40 and the inner tube 50 individually.

A gas or liquid fuel injection event is initiated by changing fuel injector 12 from a non-injection configuration to a gaseous fuel injection configuration or a liquid fuel injection configuration, respectively. Such an injection event is ended by changing the fuel injector 12 from the gaseous or liquid fuel injection configuration back to the non-injection configuration. Because the plumbing and components for either a gaseous fuel injection event or a liquid fuel injection event are similar, with the exception of lever 140, the operation of the fuel injector to perform either a gaseous or a liquid fuel injection event will be combined for the sake of brevity. The initiation of a fuel injection event includes lowering pressure in a needle control chamber 92, 95 by moving the control valve member 154, 155 away from contact with conical seat 156, 155 to open a fluid connection between the liquid nozzle chamber 99 and the drain outlet 77 via Z orifice 175, 174, the needle control chamber 92, 95 and the A orifice 173. The control valve member 154, 153 is moved toward contact with the flat valve seat 151, 150 to close a fluid connection between the liquid nozzle chamber 99 and the needle control chamber 92, 95 via the F orifice 171, 170. In the case of a liquid fuel injection event, this action is accompanied by rotating lever 140 from a first angular orientation to a second angular orientation. The step of ending an injection event includes increasing pressure in the relevant needle control chamber 92, 95 by moving the control valve member 154, 155 from contact with the flat valve seat 151, 150 to contact with the conical seat 156, 155 to fluidly connect the needle control chamber 92, 95 to the liquid nozzle chamber 99 via the Z orifice 175, 174 and parallel via the F orifice 171, 170. In the case of a liquid fuel injection event, these actions are accompanied by rotating the lever from the second angular orientation back to the first angular orientation.

During a combined injection event, both control valve members 154 and 153 move as described above. Those skilled in the art will appreciate that fuel injector 12 may operate by first initiating a gaseous fuel injection event, which some time later then becomes a combined fuel injection event. A short time later, the combined fuel injection event may return to being a gaseous fuel injection event by the liquid fuel injection event being ended. Again some time later, the gaseous fuel injection event may be ended. For instance, the injection of gaseous fuel may begin some time substantially before top dead center and continue through a substantial period after top dead center during the expansion stroke. However, the liquid fuel injection event may be relatively brief and occur at or around top dead center in order to initiate combustion of the larger gaseous fuel charge due to compression ignition of the liquid fuel charge.

Each of the electronically controlled valves 117 and 119 include over travel features that help to inhibit valve bounce in order to reduce the likelihood of undesirable secondary injections and to promote quick settling of the fuel injector components to shorten dwell times in the event that close coupled injections are desired. Thus when a fuel injection event is ended, the respective coil 102 or 104 is de-energized. When this occurs, the respective biasing spring 114 or 113 pushes valve member 154, 153 upward along with the respective linkages against the action of respective over travel springs 111 and 109. Thus, the armature 101, 103 moves from a final air gap position toward an initial air gap position. When the armature reaches its initial air gap position, the control valve 154, 153 will abruptly stop by coming in contact with conical seat 156, 155. However, the pusher 110, 112 and the associated guide piece 107, 106 will continue moving with armature 101, 103 beyond the initial air gap position toward an over travel position while the respective pusher 110, 112 simultaneously moves out of contact with the control valve member 154, 153. This over travel motion eventually is arrested by the respective over travel spring 109, 111, which then urges the armature 101, 103 back to the initial air gap position where the respective pusher 110, 112 resumes contact with the valve member 154, 153, but without sufficient impact energy to push the valve member 154, 153 off its conical seat 156, 155 to cause an undesired secondary injection event.

The control valve structure of the present disclosure provides several subtle but important advantages over previous structures. First by utilizing a conical seat to separate the drain outlet 77 from the respective needle control chambers 95, 92, virtually zero leakage of fuel occurs during the majority of the fuel injector's time in the engine cycle when no injections are occurring. This is to be contrasted with a control valve that utilizes a flat seat where some leakage is almost inevitable between injection events. By including an F orifice and adding a three-way function to the control valve 117, 119 so that the F orifice is closed during an ejection event, the rate at which pressure can build in the respective needle control chambers 95 and 92 and refill for a subsequent injection event is hastened over a counterpart fuel injector with no F orifice. By making the F orifice open through a flat valve seat, the need to closely align the center of the conical seat 156, 155 with the center of the flat seat 151, 150 is relieved since the flat seat is very misalignment tolerable. By allowing the electrical actuator to decouple form the control valve at the end of an injection event during de-energization, the geometric tolerancing in constructing the fuel injector can be somewhat relieved while also inhibiting undesirable secondary injection events due to valve bounce.

The fuel system 10 according to the present disclosure also includes several subtle functions providing advantages over known dual fuel systems. Among these are independent injection control via separate valves and separate electrical actuators for each of the gas and liquid systems. Thus, the fuel injector 12 can be controlled to inject gaseous fuel only, liquid fuel only, both gaseous and liquid fuel simultaneously, and of course have non-injection mode when no injection occurs. In addition, the dual solenoid actuator 100 conserves space without sacrificing performance capabilities. Although the migration of gaseous fuel into the liquid fuel is generally inhibited by maintaining the liquid fuel common rail 14 at a higher pressure than the gaseous fuel common rail 16, other subtle but important features assist in preventing such leakage. Cross leakage issues are also inhibited by locating the liquid fuel supply in the inner tube 50, and locating the gaseous fuel supply to injectors 12 in the outer passage 49 between inner tube 50 and outer tube 40. By locating these passageways concentrically, each fuel injector 12 can be supplied with both fuels via one passageway through the engine housing 6 (head) rather than two passageways. Lubricity of the moving components within the fuel injector 12 may be maintained by exposure to liquid diesel fuel. For instance, the guide clearance 193 associated with gas needle 73 is maintained with liquid diesel fuel to maintain lubricity, even though one end of the gas needle 73 is always exposed to gaseous fuel in gas nozzle chamber 91.

By utilizing the concentric supply strategy, the fuel system 10 of the present disclosure presents a potential opportunity for retrofitting existing engines with minimized engine cylinder head modifications. The structure of the several versions of fuel injectors 12 also inhibits the leakage of gaseous fuel into the engine cylinder by locating both the gaseous fuel nozzle outlets 90 and the liquid fuel nozzle outlets 96 in a single tip component 71, rather than via some nested needle strategy of a type known in the art. Thus, the fuel injector 12 of the present disclosure avoids stacked tolerances and other uncertainties by making each of the gas and liquid needle structures independent in their movement, seating and biasing features. This strategy may better enable mass production of fuel injectors that perform consistently with the same control signals. Finally the engine 5 of the present disclosure contemplates both a normal dual fueling mode and a limp home mode in which only liquid fuel is injected. For instance, if a malfunction occurs in the gaseous fuel system or if the gaseous fuel supply is exhausted, the electronic controller 15 may cause or allow the engine to switch from a dual fueling mode to the single fueling limp home mode.

Figure 12:
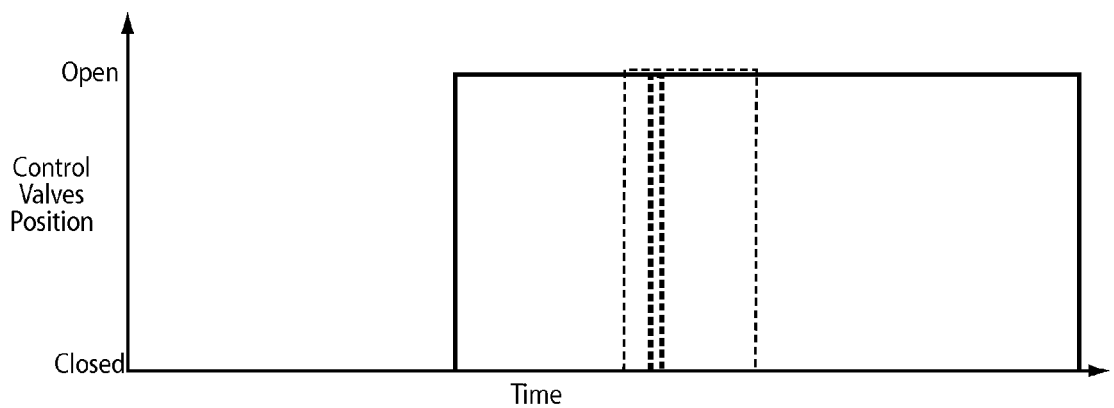
FIG. 12 is a series of graphs showing control valve positions, gaseous and liquid fuel rail pressures and injection rates verses time for the dual fuel system of FIG. 1 when operating in a dual fueling mode and a limp home mode.
Figure 12:
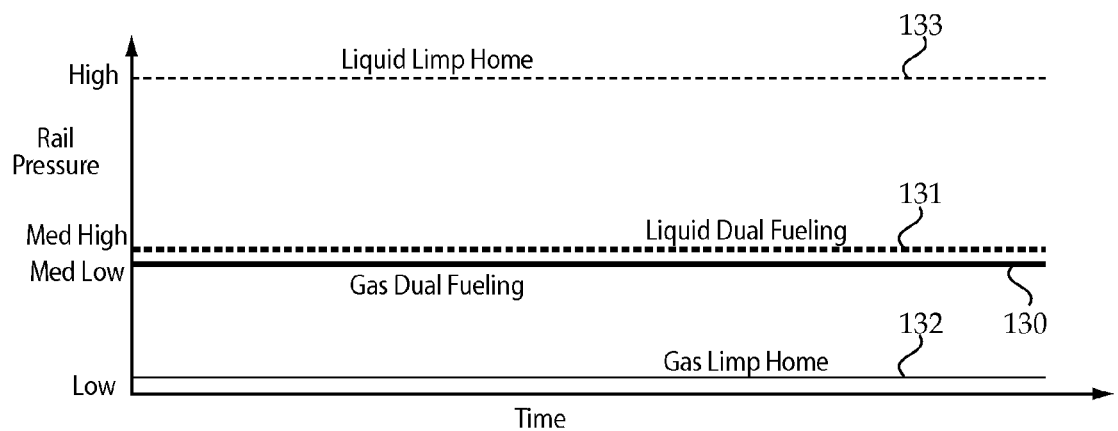
Figure 12:
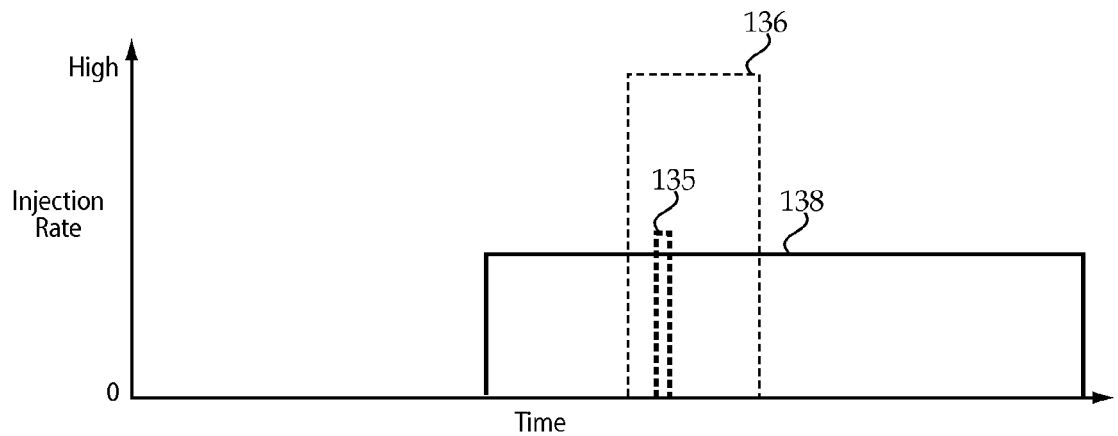

As best shown in FIG. 12, the dual fueling mode is characterized by a large gas injection quantity 138 and a small quantity injection 135 of liquid fuel in the same engine cycle. On the otherhand, the limp home mode (single fueling mode) may be characterized by no gas injection but a large quantity 136 liquid fuel injection. In addition, the normal dual fueling mode is characterized by the gas and liquid common rails 16 and 14 being maintained at medium low and medium high pressures, respectively. On the otherhand, the limp home mode may be characterized by the gaseous fuel common rail being allowed to decay to, or be maintained at, a low pressure, while pressure in the liquid common rail 14 is increased to a high pressure 133 (may be greater than 100 MPa). When operating in the dual fueling mode, a relatively small injection of liquid distillate diesel fuel is compression ignited to in turn ignite a relatively large charge of gaseous fuel at least partially previously injected into the engine cylinder. On the otherhand, during a limp home mode, engine 5 functions as a somewhat conventional diesel engine in which a relatively large quantity of liquid fuel is injected at or around top dead center of the compression stroke to instantaneously ignite upon injection in a known manner. Thus, in a dual fueling configuration, the electronic controller 15 will include a fuel system control algorithm configured to command a low pressure differential between the liquid fuel common rail 14 and the gaseous fuel common rail 16. However, during limp home or single fueling mode, the fuel system control algorithm may be configured to command a high pressure differential between the liquid fuel common rail 14 and the gaseous fuel common rail 16.

While the occurrence of engine 5 and fuel system 10 operating in a limp mode home may be relatively infrequent and rare, the present disclosure recognizes that hydraulic lock seal 93 can create a new previously unrecognized problem of potential build up of liquid fuel leakage in the gas nozzle chamber 91 and backward toward gaseous common rail 16. This migration is reduced by closure of check valve 200. When the gaseous fuel supply is resumed, the fuel system 10 will switch back into a dual fueling mode. When this occurs, gaseous fuel common rail 16 will be elevated in pressure and gaseous fuel injection events can recommence. At the same time, the relatively smaller pressure differential between the liquid fuel and the gaseous fuel in the dual fueling mode, will allow check valve 200 to reopen to maintain lubricity of gaseous needle valve member 73.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A dual fuel injector comprising:
    an injector body that defines a first fuel inlet fluidly connected to a first nozzle chamber, a second fuel inlet fluidly connected to a second nozzle chamber, and a tip component that defines a first nozzle outlet set and a second nozzle outlet set;
    a first needle valve member guided in the injector body to move between positions in and out of contact with a first valve seat positioned between the first nozzle chamber and the first nozzle outlet set;
    a second needle valve member guided in the injector body to move between positions in and out of contact with a second valve seat positioned between the second nozzle chamber and the second nozzle outlet set;
    a hydraulic lock seal for inhibiting migration of the second fuel from the second nozzle chamber into the first fuel includes an annular volume surrounding a guide segment of the second needle valve member, and the annular volume being fluidly connected to the first nozzle volume by a seal passage; and
    a check valve positioned in the seal passage that is movable to a closed position responsive to a pressure differential between first fuel in the first nozzle chamber and second fuel in a second nozzle chamber in the tip component.

2. The duel fuel injector of claim 1 wherein the check valve includes a check valve member movable between a first position out of contact with a valve seat and a second position in contact with the valve seat to close the seal passage.

3. The dual fuel injector of claim 2 wherein the check valve includes a spring biasing the check valve member away from the valve seat.

4. The dual fuel injector of claim 3 wherein the valve seat is a flat seat;
    the check valve member defines a segment of the seal passage; and
    the check valve member has a guide interaction with a bore wall defined by the injector body.

5. The dual fuel injector of claim 4 wherein the check valve member has a first hydraulic surface exposed to fluid pressure in the seal passage upstream from the check valve, and a second hydraulic surface exposed to fluid pressure in the seal passage downstream from the check valve.

6. The dual fuel injector of claim 5 wherein the annular volume and the seal passage are defined by a guide component of the injector body.

7. The dual fuel injector of claim 6 wherein the first needle valve member includes an opening hydraulic surface positioned in the first nozzle chamber, and a closing hydraulic surface positioned in a first control chamber; and
    the second needle valve member includes an opening hydraulic surface positioned in the second nozzle chamber, and a closing hydraulic surface positioned in a second control chamber;
    each of the first and second control chambers are fluidly connected to the first nozzle chamber.

8. A dual fuel system comprising:
    a dual fuel injector defining a gaseous fuel inlet, a gaseous nozzle outlet set, a liquid fuel inlet and a liquid nozzle outlet set, and having disposed therein a gaseous nozzle volume fluidly connected to the gaseous fuel inlet, and a liquid nozzle volume fluidly connected to the liquid fuel inlet, and including a hydraulic lock seal for inhibiting migration of gaseous fuel into the liquid fuel;
    a gaseous fuel common rail fluidly connected to the gaseous fuel inlet of the dual fuel injector;
    a liquid fuel common rail fluidly connected to the liquid fuel inlet; and
    a check valve positioned in a seal passage of the hydraulic lock seal, and movable between an open dual fueling configuration and a closed single fueling configuration.

9. The dual fuel system of claim 8 including an electronic controller in control communication with a gaseous pressure control device, a liquid pressure control device and the dual fuel injector;
    the electronic controller including a fuel system control algorithm configured to command a low pressure differential between the liquid fuel common rail and gaseous fuel common rail in a dual fueling configuration, and configured to command a high pressure differential between the liquid fuel common rail and gaseous fuel common rail in a single fueling configuration.

10. The dual fuel system of claim 9 wherein the dual fuel injector includes a gas needle valve member that moves between a first position in contact with a gas needle valve seat to block the gas nozzle outlet set from the gas nozzle volume, and a second position out of contact with the gas needle valve seat to fluidly connect the gas nozzle volume to the gas nozzle outlet set;
    the dual fuel injector includes a liquid needle valve member that moves between a first position in contact with a liquid needle valve seat to block the liquid nozzle outlet set from the liquid nozzle volume, and a second position out of contact with the liquid needle valve seat to fluidly connect the liquid nozzle volume to the liquid nozzle outlet set; and
    a tip component of the injector body defines the gas needle valve seat, the gas nozzle outlet set, the liquid needle valve seat and the liquid nozzle outlet set.

11. The dual fuel system of claim 10 wherein the gas needle valve member has a closing hydraulic surface positioned in a first control volume;
    the liquid needle valve member has a closing hydraulic surface positioned in a second control chamber; and
    the first control chamber and the second control chamber are fluidly connected to the liquid nozzle volume.

12. The dual fuel system of claim 11 wherein the liquid fuel inlet is surrounded by an inner conical seat and an outer conical seat, which are concentric; and
    the gaseous fuel inlet opens between the inner conical seat and the outer conical seat.

13. The dual fuel system of claim 12 wherein the hydraulic lock seal, the check valve and respective guide segments of the gaseous needle valve member and the liquid needle valve member are disposed in a guide component of the injector body.

14. The dual fuel system of claim 13 wherein the dual fuel injector includes a dual solenoid actuator moveable among a gaseous fuel injection configuration, a liquid fuel injection configuration, a combined fuel injection configuration and non-injection configuration.

15. A method of operating a dual fuel injector, comprising the steps of:

injecting a first fuel through a first nozzle outlet set by moving a first needle valve member out of contact with a first needle valve seat of a tip component;

injecting a second fuel through a second nozzle outlet set by moving a second needle valve member out of contact with a second needle valve seat of the tip component;

inhibiting migration of the second fuel into the first fuel with a hydraulic lock seal;

lubricating a guide segment of the second needle valve member with first fuel moved past a check valve in a seal passage of the hydraulic lock seal;

closing the seal passage with a check valve responsive to a pressure differential between first fuel in a first nozzle chamber and second fuel in a second nozzle chamber in the tip component.

16. The method of claim 15 including a step of changing from a duel fueling configuration to a single fueling configuration; the changing step includes raising a pressure differential between the first fuel and the second fuel, moving the check valve from an open configuration to a closed configuration.

17. The method of claim 16 including a step of biasing the check valve toward the open configuration.

18. The method of claim 17 including a step of contacting a check valve member of the check valve with a flat seat in the closed configuration.

19. The method of claim 18 wherein the step of moving a second needle valve member in a tip component out of contact with a second needle valve seat includes lowering pressure in a control chamber; and supplying first fuel from the first fuel inlet to the control chamber.

20. The method of claim 19 wherein one of steps of injecting a first fuel and injecting a second fuel includes rotating a lever from a first angular orientation to a second angular orientation.

* * * * *